United States Patent

[11] 3,609,762

| [72] | Inventor | Nicholas D. Diamantides |
| | | Cuyahoga Falls, Ohio |
| [21] | Appl. No. | 592,532 |
| [22] | Filed | Nov. 7, 1966 |
| [45] | Patented | Sept. 28, 1971 |
| [73] | Assignee | Goodyear Aerospace |
| | | Akron, Ohio |

[54] DIRECT GRADIENT-CORRELATION APPARATUS
5 Claims, 7 Drawing Figs.

[52] U.S. Cl. .................................................. 343/5 DP,
    343/5 MM, 343/100 CL, 235/181, 324/77 J
[51] Int. Cl. .................................................. G01s 9/02
[50] Field of Search .......................................... 343/5 DP, 5
    MM, 100.7; 235/181; 324/77 G, 77 I

[56] References Cited
UNITED STATES PATENTS
3,457,013  7/1969  Henf .......................... 343/5 MM X

*Primary Examiner*—T. H. Tubbesing
*Attorneys*—J. G. Pere and Oldham & Oldham

ABSTRACT: The invention provides an electronic system to achieve correlation and matching information between two similar optical displays without mechanically or electronically nutating or moving one display relative to the other. Essentially this is achieved by breaking both displays into a series of voltage signals which can be electronically summed to obtain a difference signal whereby the difference signal is scaled to determine the direction and amount of position or offset error between the two displays.

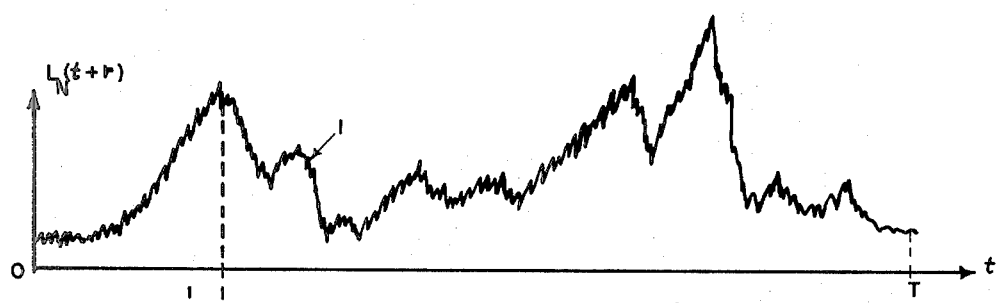
FIG.-IA
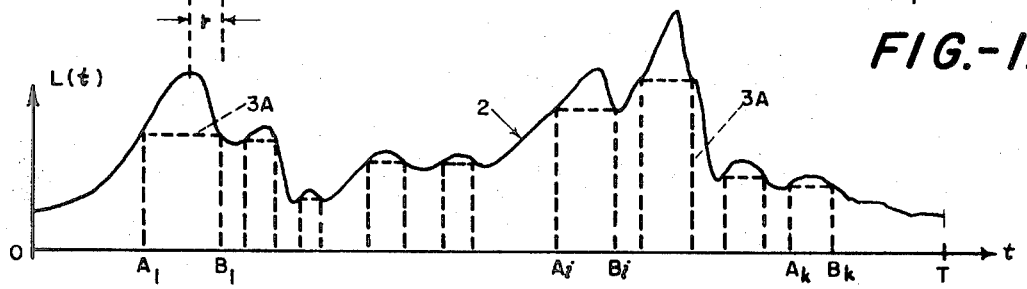
FIG.-IB
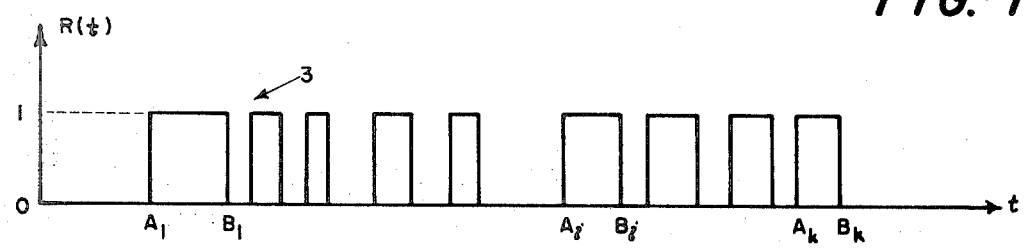
FIG.-IC
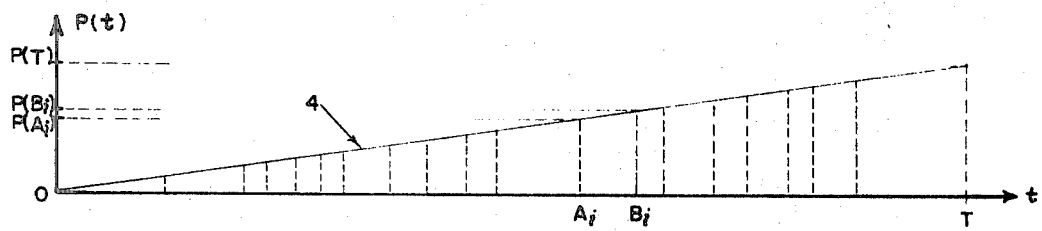
FIG.-ID
INVENTOR
NICHOLAS D. DIAMANTIDES
BY:
Oldham & Oldham
ATTORNEYS INVENTOR
NICHOLAS D. DIAMANTIDES
BY:
Oldham & Oldham
ATTORNEYS

DIRECT GRADIENT-CORRELATION APPARATUS

This invention relates to a direct gradient-correlation technique particularly adapted for map matching, which eliminates the need for nutation between the two maps to be matched.

Heretofore, it has been known that there have been many and various techniques for map matching, but these have always required some relative movement between the maps to e matched, generally known as nutation. Any purely electronic approaches have been extremely complicated and impractical.

Therefore, it is the general object of the present invention to provide a direct gradient-correlation system which may achieve map matching without the need of nutation, to thereby reduce equipment complexity and weight, while increasing the signal to noise ratios, and reducing the man-hour cost for making such correlation systems.

The aforesaid object of the invention and other objects, which will become apparent as the description proceeds, are achieved in a gradient based correlator which includes the combination of a reference image, means to represent and store the reference image as a plurality of voltage pulses, means to detect and represent a present image as a plurality of voltage pulses, means to sum the voltage at the leading edges of all pulses representing both the reference image and the present image, means to separately sum the voltages at the trailing edges of all pulses representing both the reference image and the present image, means to subtract the summed trailing edge voltages from the leading edge voltages to obtain a difference signal, and means to scale the difference signal to determine the direction and amount of position or offset error between the reference image and the present image.

For a better understanding of the invention, reference should be added to the accompanying drawings wherein:

FIGS. 1A, 1B, 1C, and 1D are graphic illustrations of voltage wave forms representing reference and present target information and further illustrating in graphic form how these waveforms may be broken down to accomplish the purposes of the invention;

Figure 2:
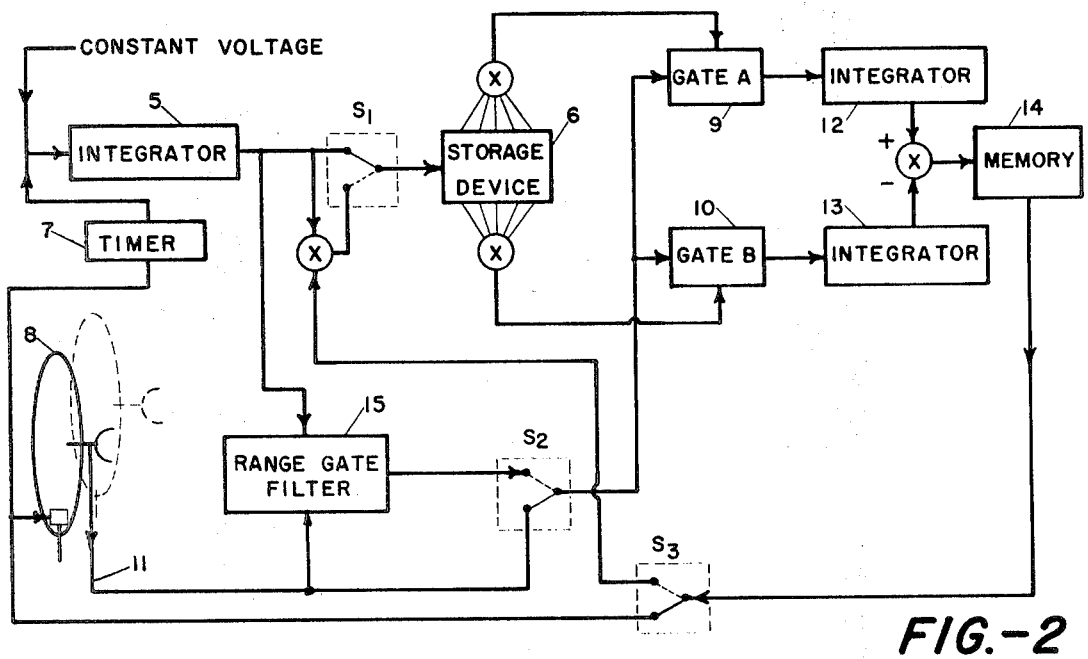
FIG. 2 is a block diagram illustrating how direct correlation can be accomplished with the waveforms of FIG. 1.

The present invention is concerned with a new type of correlator for voltage signals in general, and is particularly applicable to automatic navigation and guidance of missiles and airplanes. Its theoretical basis is the fact that two voltage signals $R(t)$ and $L(t+r)$ displaced with respect to each other by an amount "$r$" along the time axis have a correlation curve, which may also be called the static match curve that is given by the following equation:

$$\phi(r) = \int_0^T R(t) L(t+r) dt$$

where $T$ is the duration of the signals. These two signals might be illustrated by voltage waveform curves 1 and 2 in FIGS. 1A and 1B, with waveform 1 indicating what we could call present information and waveform 2 indicating what we would call reference information. It should e understood that this line video display is a voltage which varies with time and which represents the microwave energy returned from the ground as the pulse of a sector only type radar, for example, as such radar beam pulse travels along a certain direction on the ground. These types of voltage waveforms are smooth enough to have continuous first and second derivatives. The first derivative will help provide the rate of change of the correlation function, which heretofore has been obtained by nutation, as more fully explained hereinafter.

For the purposes of this invention the reference waveform 2 is broken down by a multilevel slicing, indicated by the plurality of dotted lines 3A, so that each peak, in essence, is defined by a point on its leading edge and a point on its trailing edge, with A1 representing time of occurrence of the leading edge and the B1 representing the time of occurrence for the first voltage pulse. Naturally, the leading and trailing edges of voltage pulses for each subsequent blocked out voltage peak are sequentially numbered A2–B2, etc., so as to finally define each peak in terms of leading and trailing edges.

The invention then contemplates that each of the leading and trailing edges will be represented by a binary 1 or 0 depending upon whether they are an A or a B, with the only variable then being the width or the time between the leading and trailing edges for each respective pulse. In other words, the strength of the peak makes no difference. Therefore, graph 3 of FIG. 1C represents each of the blocked-out leading and trailing edges of the graph 2 as a binary 1 or 0. Note that the strength of each of the pulses shown in graph 3 is the same.

There is more than one possibility for storing and using the information obtained by breaking the voltage peaks into the leading and trailing edges represented in graph 3. For example, storage devices might include a photographic mask in front of a flying spot scanner, an electronic storage tube, a magnetic core matrix, a range gated filter, or a voltage-level detector bank. For the purposes of describing a specific system, the voltage-level detector bank will first be considered.

Graph 4 in FIG. 1D represents a ramp voltage $P(t)$ which normally may be initiated by applying a constant voltage to an integrator 5 as seen in FIG. 2. The integrator 5 sends its output to a bank of level detector or storage device 6 which represents reference information also in terms of leading and trailing edges as described above. A suitable level detector for these purposes would be as described in B. Chance et al. "-Waveforms," McGraw Hill Book Co., 1949, p. 11. A suitable timer 7 is utilized to insure that the application of constant voltage to the integrator 5 is simultaneously applied at the onset of the return pulse from a suitable radar antenna 8. The storage device 6 is set to respond to a particular level $P(A_i)$ or $P(B_i)$ of the ramp 4 thereby producing a pulse $P(A_i)$ or $P(B_i)$, at the time $A_i$ or $B_i$ respectively. The pulses of the set $P(A_i)$ energize a gate A, indicated by numeral 9, while the pulses of the set $P(B_i)$ energize a gate B, indicated by numeral 10. Either one of these gates when open applies the radar return voltage coming over line 11 to an associated integrator 12 or 13, respectively, where summations are performed. A simple subtraction of the two integrator outputs suffices to produce a signal representing the difference between the reference signal from the storage device 6 and the actual radar turn signal received by the antenna 8. This signal represents the first derivative of the correlation function giving a measure of range difference between present and reference position. At the end of a complete scan in integrator 5, the difference signal obtained from integrators 12 and 13 is stored in a memory unit 14 and all integrator outputs are returned to 0 for another cycle. Naturally, the signal thus obtained might also be applied to the steering mechanism of a vehicle to drive it in a direction so that the resultant difference signal will reduce to 0. The point to be emphasized is that no nutation is required to achieve this result.

Another alternative would be to provide three switches S1, S2, and S3 indicated in dotted blocks, which when switched to their dotted line positions allow storage of the signal pickup by antenna 8 in a range gate filter 15 whose read-in and readout clock pulse-train is slaved to the ramped voltage input to the storage device 6 from integrator 5. The previously described computation is repeatedly performed, each time adding to the input of the storage device 6, a constant voltage increment. This is equivalent to shifting the reference map with respect to the present map until the offset $r$ is reduced to 0. Then the sum total of the voltage increments is a measure of the offset between the two maps, and is stored in the memory from where it is applied to the steering mechanism.

In both the above-described alternatives in association with FIG. 2, it is assumed that the present signal picked up by the radar antenna 8 will represent a larger or longer signal in range than the reference map signal by at least an amount corresponding to the width of the expected static curve. This presumption will always be true, with the radar apparatus mentioned above, and will result in meeting the objectives of the invention as set forth above.

It can be shown mathematically that the best performance from a noise viewpoint is achieved when the leading and trailing edge designations $A_i$ and $B_i$ are in neighborhood of the two maximum slopes of the $i$th pulse 2 of FIG. 1B. However, the objects of the invention can also be achieved when these optimum points are not exactly met.

Figure 3:
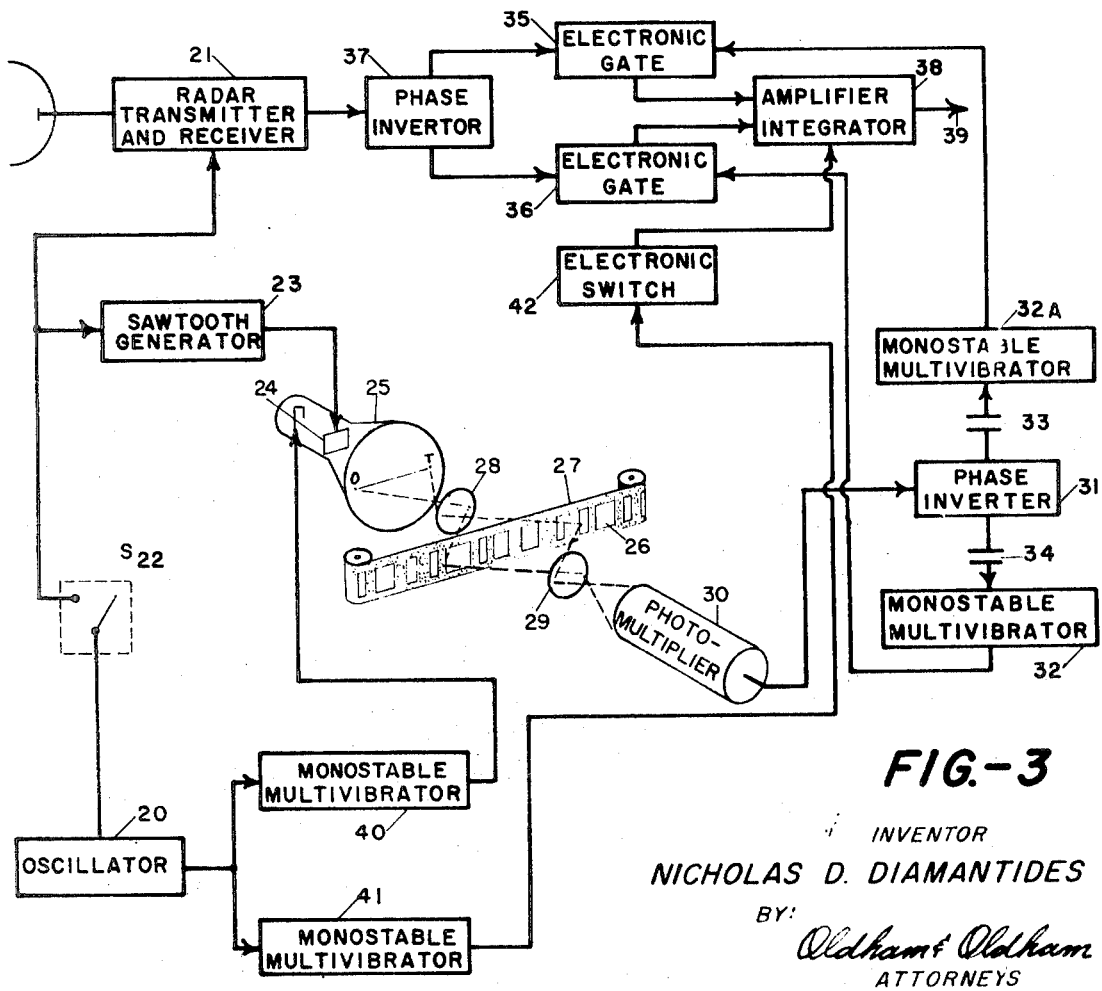
FIG. 3 is a block diagram illustrating one embodiment of specific apparatus to achieve in an analog manner the desired correlation of the invention.

Another embodiment of the invention essentially analog in nature is illustrated in FIG. 3 of the drawings. Herein a clock pulse if provided by an oscillator 20 and sent when a switch 22 is closed to the live picture or map receiver, indicated in this instance by a radar transmitter and receiver 21. Naturally, the invention contemplates that any suitable pickup, such as a radar, infrared scanner, or a television scanner which generates live map information, and which is a measure of the receiver's position coordinate over the terrain or scene viewed will meet the objects of the invention. To this end, the live map may also be a true terrain profile generated by an airborne altimeter which measures the vertical distance of the carrying vehicle from the ground surface, and therefore, indirectly, the terrain elevation above mean sea level.

The same clock pulse from oscillator 20 also triggers a sawtooth generator 23, the output of which is applied to the lateral deflection element 24 of a cathode-ray tube 25. This in turn forces the flying spot to move along a straight line OT on the face of the tube. Reference map information in this instance has been produced as rectangularly shaped images or windows, indicated generally by numeral 26, on a strip film 27. The strip film 27 is placed in front of the moving spot on the cathode-ray tube 25 so that by means of lenses 28 and 29 a photomultiplier 30 receives the alternating light projections caused by the flying spot and thus translates the white and black areas of the film 27 into a voltage which clearly represents the reference images 26, and more particularly the leading and trailing edges thereof for the purposes set forth above.

A phase inverter 31 is used to produce two copies of the signal from photomultiplier 30, each having opposite voltage polarity. Thus, two parallel and synchronous copies of the signal from photomultiplier 30 are generated. One of these signals is sent to each of the monostable multivibrators 32 and 32A, for example, with the positive pulse sent to multivibrator 32A and the negative pulse sent to multivibrator 32. The multivibrators will be responsive only to the respective positive or negative pulses. The input to the multivibrators 32 and 32A is through capacitors 33 and 34, respectively, which changes the signals to alternating positive and negative impulses corresponding to the leading and trailing edges of the original pulses. Thus, the instants at which positive voltage pulses appear at the output end of capacitor 33 correspond to the leading edges $A_i$ while the instants at which negative pulses appear at the output end of capacitor 34 correspond to the trailing edges or points $B_i$. The output of multivibrator 32A energizes an electronic gate 35 while the output from multivibrator 32 energizes an electronic gate 36.

At the time the phase inverter 31 generates the reference target information, a second phase inverter 37 serves to generate a negative image of the live map from the radar transmitter and receiver 21. Thus, a positive signal of the live map is sent to an electronic gate 35 while a negative signal of the live map is sent to an electronic gate 36. These two signals are thus sent as inputs to these respective gates which are open only at the moments $A_i$ or $B_i$ dependent on the drive from the monostable multivibrators 32 and 32A, respectively. Therefore, the opening of gates 35 and 36 determines the length of the time interval during which the present signal information is sampled. The outputs from the electronic gates 35 and 36 are sent to an amplifier integrator 38 which produces a dynamic match curve so that its output 39 represents the range offset that happens to exist between the reference map information and the information received from the radar transmitter and receiver 21. Naturally, as pointed out above, this represents only a range offset estimated along a line of a definite azimuth where the present information is compared to the reference information.

The clock pulse from oscillator 20 also triggers separate monostable multivibrators 40 and 41. The multivibrator 40 is adjusted so that it remains on for a time interval slightly less than the duration of the scan of radar transmitter receiver 21 so that in its on state the multivibrator 40 supplies the unblanking voltage necessary for the cathode-ray tube light spot to be on. Since this multivibrator 40 assumes its off state between scans, the cathode-ray tube 25 is darkened during this period. On the other hand, the time constant of multivibrator 41 is set so that the latter remains in its on state up to a time slightly less than the start of the succeeding scan at which time it switches to its off state. This switching-off appears as a voltage pulse and energizes an electronic switch 42 which then discharges the amplifier integrator 38 between scans.

The sequence of events described above with reference to FIG. 3 clearly illustrates that a correlation operation is repeated with every clock pulse coming from oscillator 20.

Figure 4:
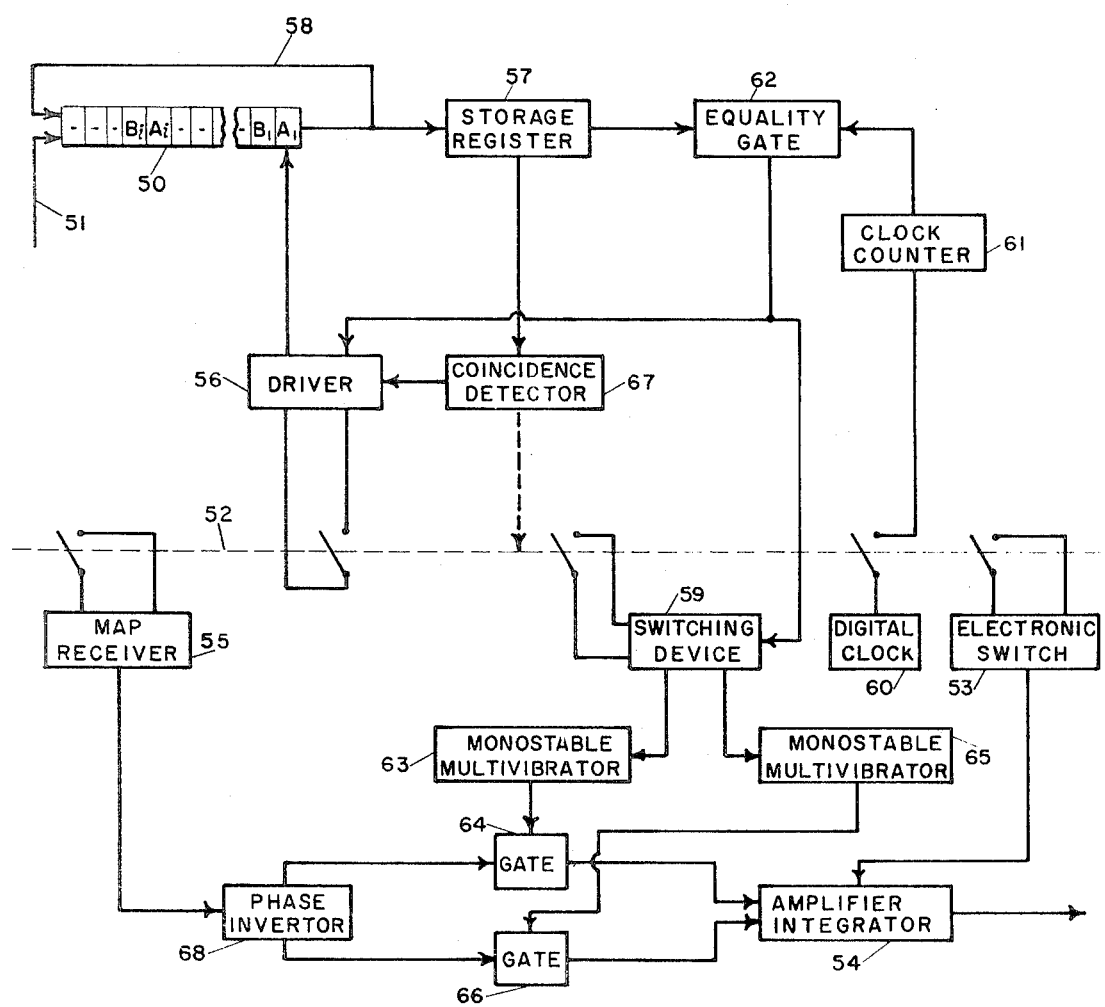
FIG. 4 is a block diagram of another specific circuit which might be utilized in a digital manner to accomplish the desired correlation of the invention.

A second embodiment of the invention, essentially digital in nature, is illustrated in FIG. 4. As shown therein, the positions of the sampling pulses $A_i$ and $B_i$ are stored as binary numbers representing words in a shift register 50 having sufficient stages to incorporate one complete reference image. Input to the shift register 50 may be via a line 51, and any suitable means to supply the input information may be utilized. Each word may be broken down into as many bits as needed by the selected length of the reference map and the desired position accuracy of the sampling pulses. If, for instance, the length of the reference map were 20 miles and the desired position accuracy were 30 feet, the number of bits in the shift register would be 12.

The closing of a starting switch 52, indicated by the extended dotted line, accomplishes the following functions:

a. Energizes momentarily an electronic switch 53 discharging an amplifier integrator 54 to 0;
b. Energizes a map receiver 55, which of course may be any suitable radar, optical, or other equipment to detect present image information;
c. Energizes a driver 56 which transfers the first bit from the shift register 50 to a storage register 57 and at the same time advances all other bits of the word by one step in the shift register 50. Since a recirculation path 58 is provided around the shift register 50, the first bit is also shifted to the last position;
d. Causes the switching device or flip-flop 59 to assume one or the other of its two positions, and
e. Connects a digital clock 60 to a clock counter 61.

When the number indicated by the clock counter 61 matches the one in the storage register 57, an equality 62 between the storage register 57 and the clock counter 61 generates a pulse which has a dual function. Firstly, it energizes the driver 56, thus advancing each bit in the shift register 50 by one step. Secondly, it switches the device 59 from its present state to its other state, and in so doing the device 59 generates a pulse that actuates a monostable multivibrator 63 which in turn actuates a gate 64. Thus, gate 64 is turned on for the short period of time in accordance with $A_i$ information from the reference bit stored in the shift register 50.

Subsequently, the bit corresponding to the position of pulse $B_i$ is now present in the storage register 57. Since the clock counter 61 continues to advance past the previous bit $A_i$ and towards bit $B_i$, the time will come when the word in the clock counter 61 is also $B_i$. When this occurs, the equality gate 62 will again generate a pulse which, as previously, advances the shift register 50 by one step and switches the device 59 from its state corresponding to $A_i$ to its state corresponding to $B_i$; this generates the pulse which thus energizes a monostable multivibrator 65 and also gate 66 connected thereto to achieve a sampling of the signal passing through gate 66 only during that period of time.

The above process is repeated until the last pulse $B_i$ is brought into the storage register 57. Since in general the shift register 50 will be longer than the reference map, the last pulse $B_i$ will be followed by a number of zeros. Any logic can be utilized to stop the correlation process when the storage register 57 begins to receive these zeros. A coincidence detector 67 may be used for this purpose which in response to a zero opens the switch 52 stopping the sampling process, and also sends a pulse to the driver 56 that in turn advances the shift register 50. This last step is repeated until all supply words in the shift register are run through.

The circuit elements preceding and following the gates 64 and 66 are the same as in the analog embodiment shown in FIG. 3. A phase inverter 68 receives a direct output from the receiver 55, and the integration of the outputs from gates 64 and 66 by the amplifier integrator 54 gives an output signal which represents the displacement of the present signal information from the map receiver 55 in relation to the prepared reference information stored in the shift register 50.

To repeat the correlation process in this case, the starting switch 52 should be closed again. This, of course, may be done automatically or manually as selectively desired.

Thus, it is seen that the objects of the invention have been achieved by breaking a reference signal representing a terrain surface along a certain azimuth line into a plurality of voltage pulses, breaking the voltage pulses into leading and trailing edges with comparison of the present signal only at the times designated by the leading and trailing edges of the reference signal whereby displacement between the edges, represented as a difference signal, is the actual range displacement between the two signals which have been correlated. The correlation is achieved without nutation, and any aircraft or other vehicle utilizing the system may correct a flight path in accordance with the error information determined.

While in accordance with the patent statutes only one best known embodiment of the invention has been illustrated and described in detail, it is to be particularly understood that the invention is not limited thereto or thereby, but that the inventive scope is defined in the appended claims.

What is claimed is:

1. In a gradient-based correlator the combination of a reference image,
means to represent and store the reference image as a plurality of voltage pulses,
means to detect and represent a present image as a continuous voltage,
means to sample the continuous voltage of the present image at times corresponding to the leading edges of the voltage pulses of the reference image and to sum such samples,
means to sample the continuous voltage of the present image at times corresponding to the trailing edges of the voltage pulses of the reference image and to sum such samples,
means to determine a difference signal between the sums of the two samplings, and
means to scale the difference signal to determine the direction and amount of error between the reference image and the present image.

2. A correlator according to claim 1 adapted to be mounted within an aircraft where the position speed and direction of the aircraft determine system constants, and where the means to detect and represent the present image is a radar transmitter and receiver.

3. A correlator according to claim 1 where the means to represent and store the reference image includes a photographic negative the reference image formed thereon as a plurality of geometric shapes, a flying spot scanner, means to scan across the negative with the scanner, and photocell means to measure the light through the negative on each path of the scanner thereacross and represent this light passage as a plurality of voltage pulses.

4. A correlator according to claim 3 where the present image information is only sampled at those times corresponding to the preselected leading and trailing edges of the reference image information, with the difference between the summation of these separate samplings representing the range displacement of the present image information from the reference image information.

5. A correlator according to claim 1 where the means to represent and store the reference image includes a shift register, a digital clock operating in combination with a clock counter to process binary ones representing leading edges and binary zeros representing trailing edges from the shift register in properly timed sequence whereby the processing of each binary one and zero controls the time and period of sampling of the present image information.